H. J. BUTT.
RUNNING GEAR FOR HAY PRESSES.
APPLICATION FILED SEPT. 28, 1909.
988,172.
Patented Mar. 28, 1911.
5 SHEETS—SHEET 1.
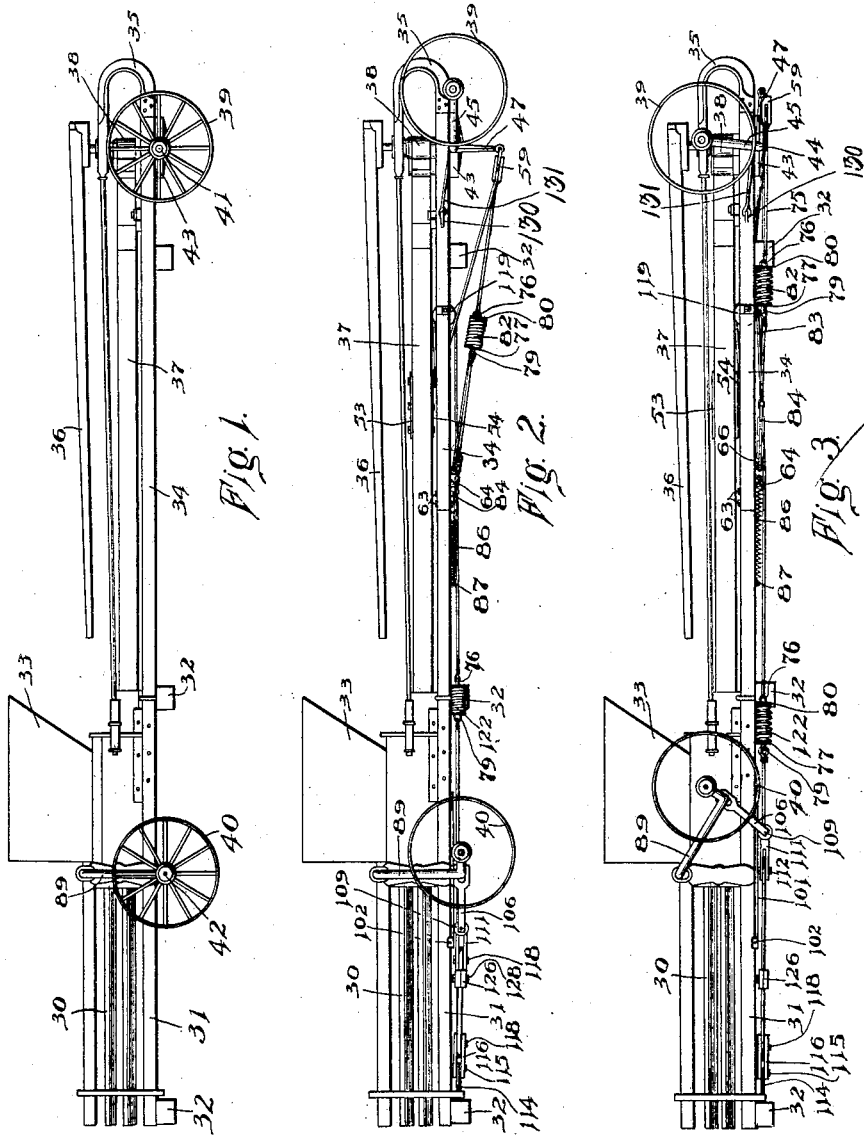
Witnesses
Inventor
Henry J. Butt,
By
Attorneys H. J. BUTT.
RUNNING GEAR FOR HAY PRESSES.
APPLICATION FILED SEPT. 28, 1909.
988,172.
Patented Mar. 28, 1911.
5 SHEETS—SHEET 2.
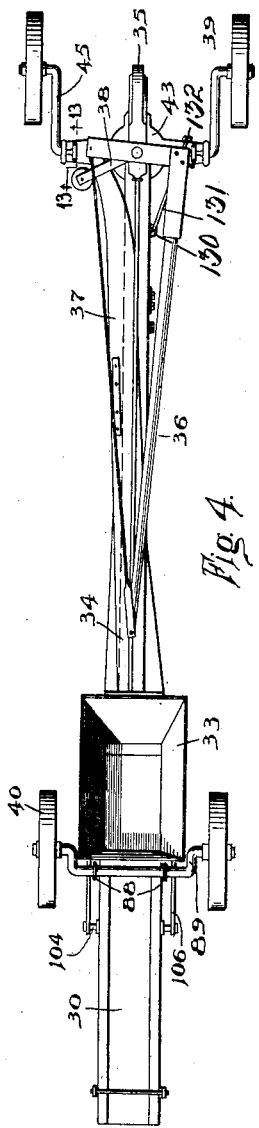
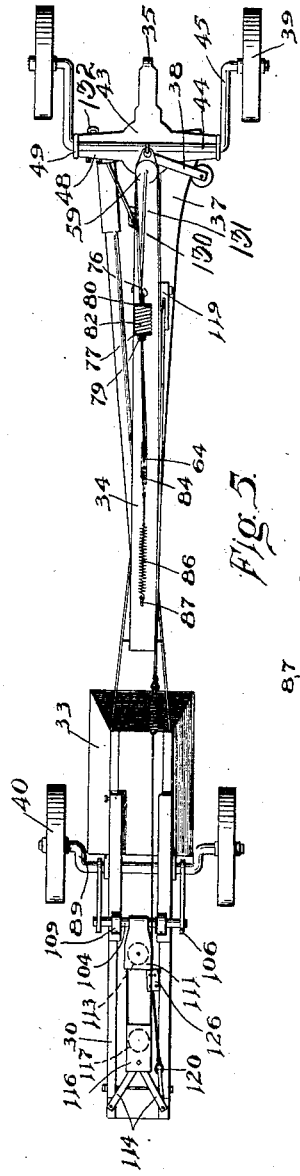
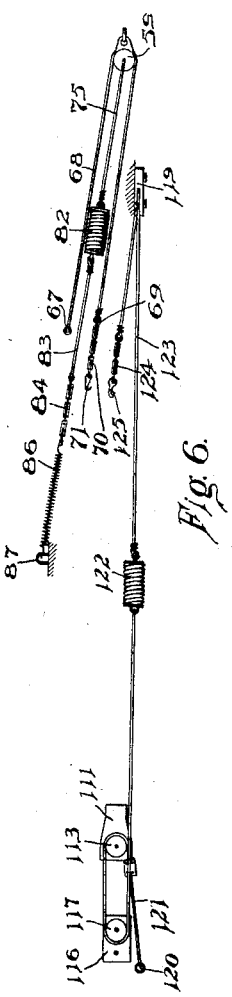
Witnesses
Inventor
Henry J. Butt.
By
Attorneys H. J. BUTT.
RUNNING GEAR FOR HAY PRESSES.
APPLICATION FILED SEPT. 28, 1909.
988,172.
Patented Mar. 28, 1911.
5 SHEETS—SHEET 3.
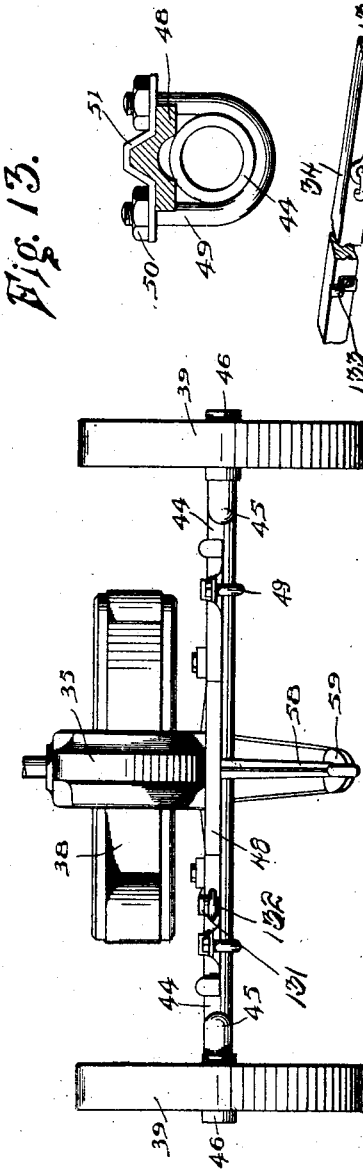
Witnesses
J. S. Freeman.
Inventor
Henry J. Butt,
By Chandler & Chandler
Attorneys.

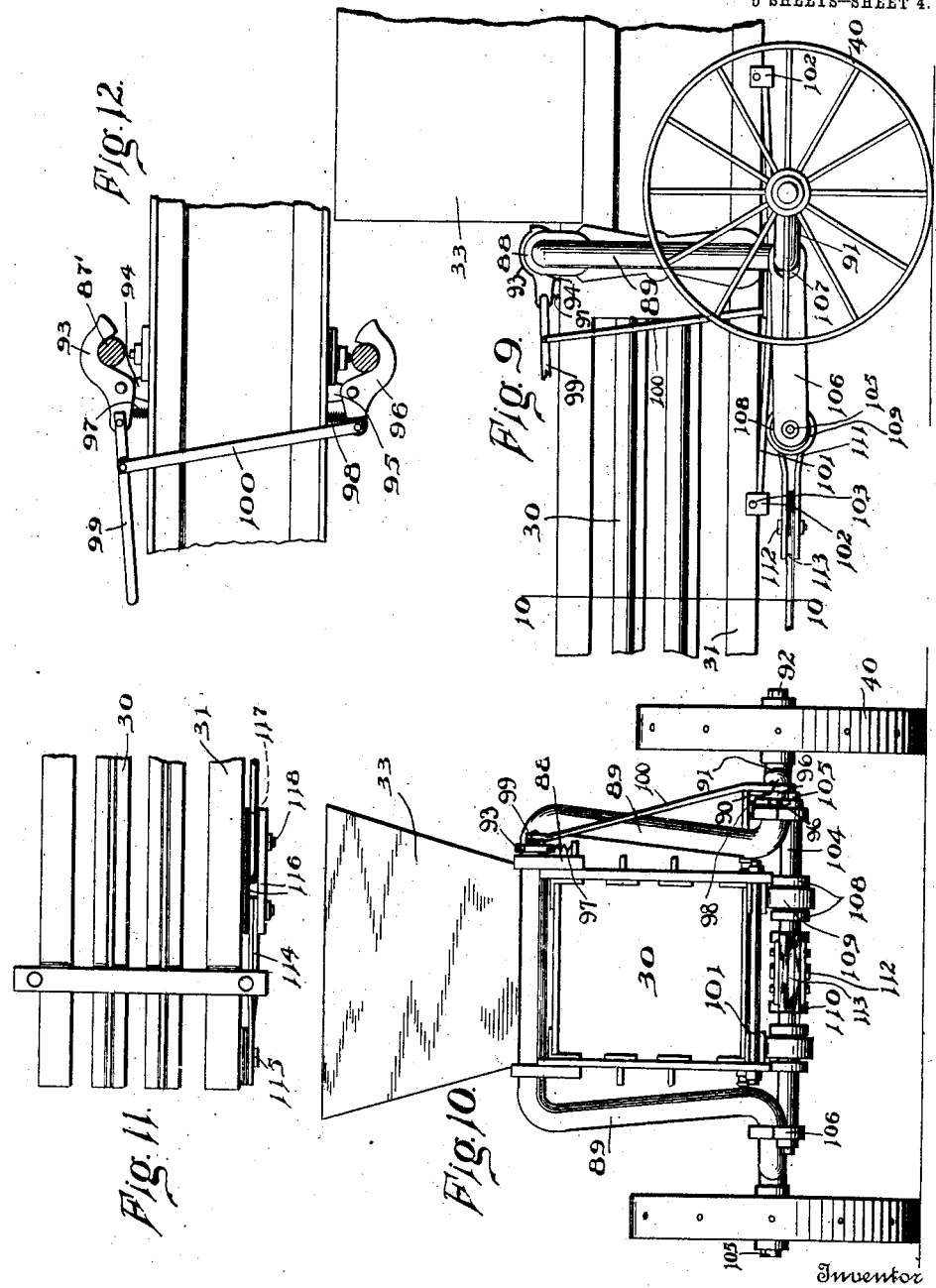

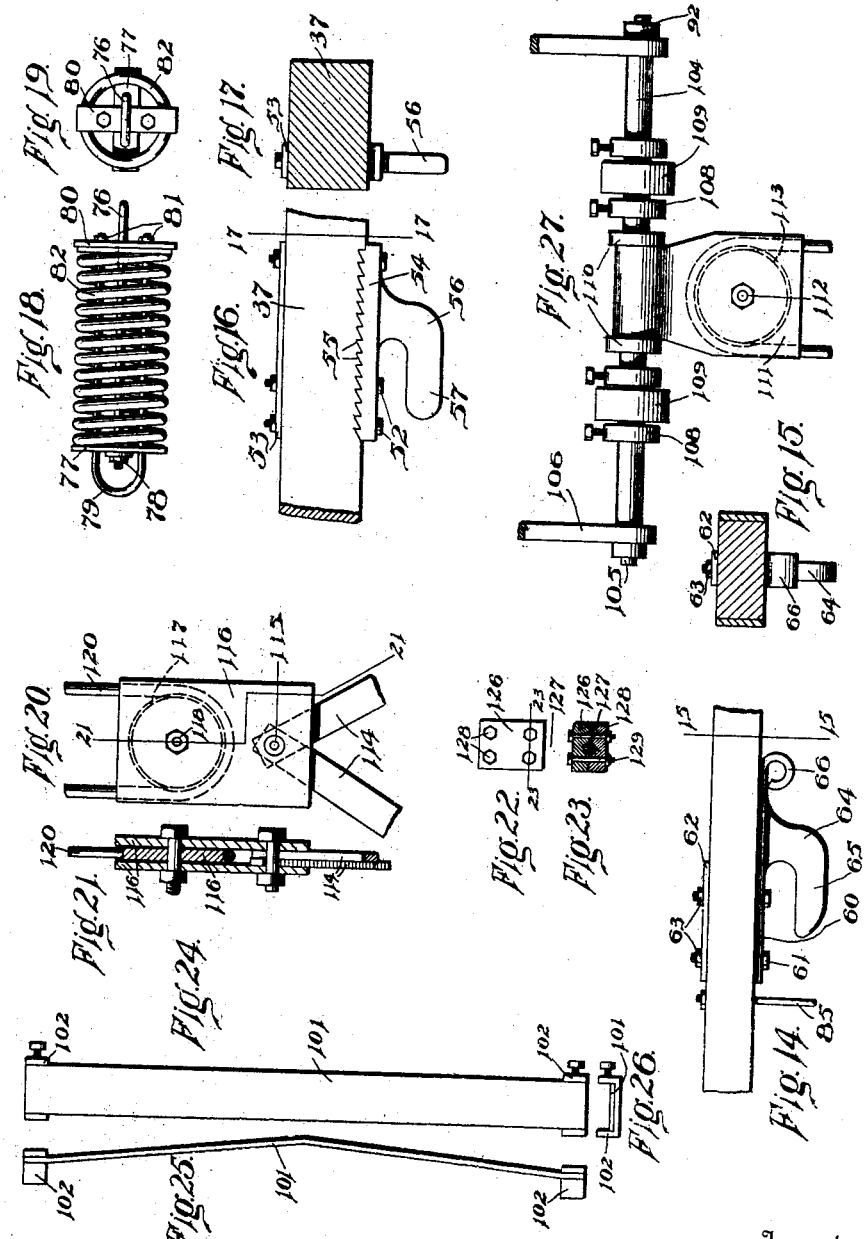

UNITED STATES PATENT OFFICE.

HENRY J. BUTT, OF BELL, TERRITORY OF NEW MEXICO.

RUNNING-GEAR FOR HAY-PRESSES.

988,172.  Specification of Letters Patent.  Patented Mar. 28, 1911.

Application filed September 28, 1909. Serial No. 519,912.

*To all whom it may concern:*

Be it known that I, HENRY J. BUTT, a citizen of the United States, residing at Bell, in the county of Colfax, Territory of New Mexico, have invented certain new and useful Improvements in Running-Gear for Hay-Presses; and I do hereby declare the following to be a full, clear, and exact description of the invention, such as will enable others skilled in the art to which it appertains to make and use the same.

This invention relates to baling presses such as are commonly used for the purpose of baling hay and the like.

The invention has especial reference to an attachment for or construction of presses of this character in the form of a running gear so arranged that the press may be raised up from the ground on wheels or may be allowed to rest on the ground during the operation of the baling.

The principal object of the invention is to provide a form of running gear which may be used for transporting the press from place to place and which is also arranged in such manner that the press may be lowered on to the ground and rest in that position when baling hay.

Another object of the invention is to provide an improved form of wheel locking means for such a device.

With the above and other objects in view the invention consists in general of a baling press equipped with a novel and improved form of running gear.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 shows a baling press constructed in accordance with this invention with the special running gear removed and running gear of the ordinary type substituted therefor. Fig. 2 is a side elevation of a press in its raised position equipped with the improved running gear. Fig. 3 is a similar side elvation of a press with the improved running gear, the press being shown as resting on the ground. Fig. 4 is a top plan view of a press constructed in accordance with this invention. Fig. 5 is a bottom plan view thereof. Fig. 6 is a view showing diagrammatically the arrangement of the elevating chains and gear. Fig. 7 is an enlarged detail elevation of the front end of a press constructed in accordance with this invention. Fig. 8 is a front elevation of the portion of the press shown in Fig. 7. Fig. 9 is a partial side elevation of the rear end of the press, the view being to an enlarged scale. Fig. 10 is a view on the line 10—10 of Fig. 9. Fig. 11 is a view of the extreme rear end of the press, the view being in side elevation. Fig. 12 is a view of the locking mechanism for holding the rear wheel axle in proper position. Fig. 13 is an enlarged section on the line 13—13 of Fig. 5, the view being arranged to show the clips for holding the axle. Fig. 14 is a side elevation of an enlarged scale of a portion of one of the frame members with the special hook, hereinafter described, applied thereto. Fig. 15 is a section on the line 15—15 of Fig. 14. Fig. 16 is a view showing a different form of hook in side elevation. Fig. 17 is a section on the line 17—17 of Fig. 16. Fig. 18 is a side elevation of one of the springs used in connection with this invention. Fig. 19 is an end elevation of the spring shown in Fig. 18. Fig. 20 is a plan view of one of the sheaves and the parts adjacent thereto used in connection with this invention. Fig. 21 is a section on the line 21—21 of Fig. 20. Fig. 22 is a plan view of one of the rope clamps used herewith. Fig. 23 is a section on the line 23—23 of Fig. 22. Fig. 24 is a plan view of a track used for the yoke controlling the rear axle. Fig. 25 is a side elevation thereof. Fig. 26 is an end elevation thereof. Fig. 27 is a detail of the yoke used on the rear axle. Fig. 28 is a perspective view of the means used to prevent the front axle from swinging on its center casting during the raising or lowering of the device.

The numeral 30 indicates the baling chamber of a press of ordinary construction and this baling chamber is supported on bottom timbers 31 which are connected together by means of transverse beams 32. At the forward end of this baling chamber is a feed hopper 33 and extending outward from its forward end is a reach 34 to the front of which is attached a yoke 35 whereon is mounted the usual sweep 36 common in baling presses of the plunger type. At 37 is indicated a pitman or plunger rod and this is actuated to move to and fro by the mechanism shown in general at 38, no detail description of this being deemed necessary as it may be any of the ordinary mechanisms employed for this purpose and forms no part of this invention. This frame just described is that common to baling presses of this description and is carried on wheels 39 and 40 which are supported on axles 41 and 42 at the front and rear of the machine. At 43 is the ordinary type of fifth wheel the details of which are not deemed necessary to be shown, it being thought sufficient to state that the front axle 41 is secured thereto in such manner that it revolves freely on a vertical pivot.

In the application of the present invention the axles 41 and 42 are removed and in place of the axle 41 there is mounted on the fifth wheel an axle 44 provided with crank arms 45 extending at right angles therefrom and at the outer extremities of these crank arms are journals 46 whereon the wheels 39 may be mounted. Centrally disposed of the axle 44 is an arm 47 which is arranged at right angles to the crank arms 45, the axle thus forming a species of rock shaft. This axle is secured to the under side of a bolster 48 forming part of the fifth wheel by means of clips 49 U-shaped in form and provided with the usual securing nuts 50 and strap 51. The pitman 37 is provided with a series of bolt receiving apertures wherein are held bolts 52 and on the upper ends of these bolts is a washer plate 53. On the under side of the pitman 37 and immediately below the washer 53 is a hook having a base 54 provided with a series of serrations 55, the individual serrations extending across the base and the series along the length thereof. This base is further perforated to receive the bolts 52 and by means of the serrations 55 is securely held to the pitman 37. On this base is formed a downwardly and rearwardly extending hook 56 the terminal portion 57 of which lies parallel to the base 54, the hook thus opening toward the rear of the machine.

Upon the free or outer end of the arm 47 is an eye 58 whereto is attached a sheave 59. Upon the reach 34 is secured a hook having a base 60 provided with suitable perforations for the reception of bolts 61 which pass through the reach and through a washer plate 62 on the top thereof, being secured by means of nuts 63. This hook is formed, like the hook 56, with a downwardly and rearwardly extending portion 64 terminating in a rearwardly directed end 65 which lies parallel with the base. The forward end of the base of this hook is formed with an eye 66 wherein is held an eye 67 of a flexible element such as a wire cable 68. The other end of this flexible element is provided with an eye 69 and has attached thereto a chain 70 terminating in a hook 71. This flexible element passes through the sheave 59 and the hook 71, when the press is being transported from place to place or when it is desired to raise the same from the ground, is engaged with the hook 56. In order to relieve the strain on the cable and act as a counterbalance for the weight of the front end of the machine, certain spring provision is made. The sheave 59 is provided with a strap 72 having an eye 73 at the forward end thereof and this strap is held on the sheave by means of the usual pivot bolt 74 which carries the pulley of the sheave. Secured to the eye 73 is a flexible element 75 the free end of which is connected to a U-shaped bar 76 which carries upon its extremities a plate 77, the plate being held in position by means of suitable nuts 78. At 79 is a second U-shaped bar which is freely slidable through suitable openings in the plate 77 and which projects through certain openings in a plate 80 which is freely slidable on the U-shaped member 76. The member 79 is provided with nuts 81 on its extremities to prevent the plate 80 from slipping from the member. Between the plates 77 and 80 and surrounding the extremities or parallel portions of the members 79 and 76 is a coil compression spring 82. To the member 79 is attached a flexible element 83 having a chain 84 secured to its end, and this chain is led through a U-shaped clip 85, the extremities of which pass through the reach 34. To the free end of this chain 84 is attached a spring 86 of considerably lighter construction than the spring 82. By reason of the dimensions of the member 85 the chain 84 is restricted in movement so that but one link of said chain can move backward and forward through the member 85. Projecting downward from the reach 34 is an eye 87 to which the free end of the spring 86 is attached. Considering now the operation of this end of the lifting device: When the eye 67 is secured to the eye 66 and the hook 71 to the hook 64, the parts will be in position to pull upon the arm 47. If, now, the pitman 37 be moved by the sweep 36 toward the rear of the machine, the hook 56 will also be caused to move toward the rear of said machine. This will pull upon the flexible cable 68 and if the parts be in the position shown in Fig. 3, will draw upon the arm 47 and tend to force the wheels 39 downward with respect to the reach 34. Since the wheels cannot move downward it will be obvious that the reach itself will be moved upward. Now, when the parts are in the position shown in Fig. 3 both the spring 86 and the spring 82 will be under stress. It will be noted from an inspection of Fig. 3 that the turning moment of the arm 47 around the axis of the axle 44 is relatively small. Consequently, the relatively great force exerted by the spring 82 is needed at this time to assist in lifting the forward end of the machine. This force is exerted by reason of the fact that the chain 84 has moved as far forward, when the machine is on the ground, as is possible and the spring 82 has then been compressed. When, however, the arm 47 has been turned to some degree the force of the spring 82 will be sufficient to again expand that spring to such an extent that the stress on the spring 82 will be equal to the stress on the spring 86. From this point onward till the arm has been brought to the position shown in Figs. 2 and 7 both the springs 82 and 86 will exert a lighter stress on the arm 47 but this stress will be sufficient to materially assist in lifting the machine. As the spring 86 contracts under this lighter stress the chain will be drawn through the guide 85 so that the relatively great movement of the sheave in the direction of length of the machine will be compensated for. This construction has been found necessary by reason of the fact that if the heavy spring 82 was made of sufficient length to compensate for the movement of the arm 47 it would be so large as to be unwieldly and the construction here embodied has been found more effective, of less weight, and cheaper to manufacture.

The rear axle 42 is replaced by means of the axle having a central portion 87' which extends across the top of the baling chamber and is held thereon by means of journal boxes 88. This axle is provided with downwardly bent portions 89 which extend down to a point just below the baling chamber. At this point the axle is bent outwardly as indicated at 90 for a short distance and is bent forwardly as indicated at 91. At the extremities of these forwardly bent portions the axle is bent outwardly to provide wheel journals 92 whereon the wheels 40 are mounted. By means of this construction the wheels may be swung up alongside the baling chamber so that the chamber and the rear end of the press may rest upon the ground. In order to hold the axle in the position indicated in Fig. 2 certain lock mechanism is provided. This lock mechanism includes a catch 93 which is pivotally mounted on a bracket 94 secured to the top of the baling chamber and this catch engages over the portion 87' of the axle. On the bottom of the baling chamber is a bracket 95 whereon is pivotally mounted a catch 96. This catch engages over one of the portions 90 of the axle. A spring 97 normally holds the catch 93 in engagement with the axle portion 87' while a spring 98 holds the catch 96 in engagement with its portion of the axle. Pivotally connected to the rear end of the catch 93 is a lever 99 and a link 100 has one end connected to this lever intermediate its ends and the other end connected to the catch 96. By means of this construction when the handle end of the lever 99 is raised the catches 93 and 96 will be released from their portions of the axle as the lever itself will depress the rear end of the catch 93 while the link will act upon the rear end of the catch 96 to raise that end. Furthermore, the catch 93 serves as a friction brake on the axle 87 so that the wheels 20 may be allowed to rise slowly by first releasing the catches and then moving the lever 99 to cause the catch 93 to bear strongly on the axle 87.

Beneath the baling chamber are supported a pair of tracks 101. These tracks consist of metal plates bent downward at the middle and at each end these plates have secured thereto U-shaped clips 102 arranged to fit over the longitudinal sills of the baling chamber. Each of these clips is provided with a set screw or bolt 103 for the purpose of clamping the clip firmly to the sill which it engages.

At 104 is indicated a bar which is provided with reduced ends 105. On the reduced ends 105 are held the rear ends of links 106, the forward ends of which are provided with slots 107 which engage over the portions 90 of the rear axle. On the bar 104 are spaced collars 108 arranged in pairs and between each pair of these collars is a roller 109 which bears against the under side of one of the tracks 101. The bar 104 is further provided with other collars 110 between which is held a strap 111 the ends of which are arranged to lie parallel and are perforated to receive a bolt 112 whereon is mounted a pulley 113. This strap and pulley thus form a sheave or block. At the rear end of the baling chamber are plates 114 which are securely attached to this rear end by means of bolts 115 and these plates have secured on each side thereof other plates 116 between which is mounted a pulley 117, the pulley being carried on the usual pivot bolt 118. Toward the forward end of the reach 34 there is provided a sheave 119 which is securely attached to the reach. At the rear end of the baling chamber is an eye 120 whereto is secured one end of a flexible element such as a wire or other cable 121 and this cable is led from the eye 120 around the pulley 113 and from thence back and around the pulley 117. From this pulley the cable 121 extends forward on the machine and has its free end connected with one of the U-shaped members of a spring 122 which is similar in all respects to the spring 82 illustrated in Figs. 18 and 19. To the other end of the spring 122 is connected a cable 123 which is led around the sheave 119 and to the free end of this cable is connected a chain 124 provided on its end with a hook 125 which is adapted to be engaged with the hook 56 previously described. Between the pulley 113 and the eye 120 the cable 121 has secured thereon a clip which consists of a pair of blocks 126 each of which has a substantially semi-circular groove 127 extending longitudinally thereof for the purpose of receiving the cable. These blocks are secured together by means of bolts 128 and nuts 129.

In order to prevent the front axle from swinging on its center casting or king pin during the raising and lowering of the device there is attached to the bar 34 a clip 130 whereon is mounted a hook member 131 and on the member 48 is provided a loop 132, the hook being of such length and the loop so positioned that the end of the hook may be engaged in the loop when the front axle is at right angles to the member 34. Upon the member 34 is further provided a support 133 adapted to receive the end of the hook 131 when the same is not in use. It is to be understood that during the time of raising or lowering the press the hook 131 is to be engaged in the loop 132, while at other times the hook will rest in the member 133.

In order to understand the operation of raising the rear end of the machine let it be supposed that the parts are in the position shown in Fig. 3. Now, when the pitman 37 is forced rearward stress will be brought to bear on the cable 123 and consequently on the cable 121. This will cause the pulley 113 to be drawn toward the rear of the machine and will consequently move the yoke composed of the bar 104 and links 106, toward that end of the machine. This will operate to revolve the bent axle 89 in the journals 88 and as the operation is continued, will cause this axle to assume the position shown in Fig. 2. As this operation takes place the rollers 109 roll along the tracks 101 thus preventing injury to the bottom of the baling chamber. At the beginning of this operation the turning moment around the axis of the axle is shorter than the turning moment at the end of the operation. In consequence of this the clip carried on the cable is so positioned that as the operation begins the cable is allowed to move through the sheave carrying the pulley 113. As the operation proceeds the clip contacts with the plates of this sheave and the cable is prevented from moving therethrough, the draft being direct on this sheave. By this means not only is the increased turning moment compensated for but at the same time the motion of the wheels toward the rear end of the baling chamber, which toward the end of the operation is relatively great, is also compensated for.

The spring 122 serves to prevent any undue shock in raising or lowering the rear end of the machine. As the axle assumes the position shown in Fig. 2 the clips or latches 93 and 96 come into operation and securely hold the same in position while at the same time preventing too great movement toward the rear of the baling chamber. Since the hooks 71 and 125 are both connected to the hook 56 in the operation of raising, both ends of the machine will be simultaneously raised and as this is done by the draft animals pulling on the sweep this operation may be performed by any person old enough to drive a horse, the operation being entirely accomplished by the strength of the draft animals.

It is to be noted that when the press is positioned as shown in Fig. 3 the front wheels may be removed for the purpose of lessening the obstruction of the sweep. It is further to be noted that when in operation as a press the lifting elements are disconnected from the hook 56 so that the operation of the device as a press is not interfered with.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a hay press provided with a pitman and pitman actuating means; the combination of bearings fixed on said press, U-shaped axles having their central portions revolubly held in said bearings, outwardly extending journals formed on said axles, wheels on said journals, a hook on said pitman, flexible elements arranged to operate said axles, and means at one extremity of each of the elements to engage said hook.

2. In a hay press provided with a pitman and pitman actuating means; the combination of bearings fixed on said press, U-shaped axles having their central portions revolubly held in said bearings, outwardly extending journals formed on said axles, wheels on said journals, a hook on said pitman, flexible elements arranged to operate said axles, means at one extremity of each of the elements to engage said hook, and springs forming part of said flexible elements.

3. In a hay press provided with a pitman and pitman actuating means; the combination of bearings on said press, a U-shaped front axle having its central portion revolubly held in said bearings, outwardly extending journals on said axle, wheels on said journals, a rock arm projecting from said axle, a sheave carried at the end of said rock arm, a flexible element having one end connected to the fixed portion of said press and the other end detachably connected to the pitman, a second flexible element having one end connected to the fixed portion of said press and the other end connected to said sheave, and a spring forming part of said flexible element.

4. In a hay press provided with a pitman and pitman actuating means; the combination of bearings fixed upon said press, a U-shaped rear axle having its central portion revolubly held in said bearings, outwardly extending ends formed on said axle and provided with journal portions, wheels on said journals, a yoke carried on the outwardly extending ends, a sheave fixed to said yoke, a flexible element having one end connected to the fixed portion of said press and running through said sheave, the other end of said element being detachably connected to said pitman, and guide sheaves for said element.

5. In a hay press provided with a baling chamber, a pitman and pitman actuating means; the combination of bearings mounted on the top of the baling chamber, a U-shaped axle having its central portion revolubly held in said bearings, outwardly projecting ends provided with journal portions formed on said axle, tracks mounted beneath said baling chamber, a yoke including a bar having a pair of links connected to the ends thereof, said links having their free ends connected to the outwardly projecting portions of the axle and the bar lying beneath the baling chamber, rollers on said bar arranged to run on said tracks, and means to move said bar longitudinally of the baling chamber to rotate the axle.

6. In a hay press provided with a baling chamber, a pitman and pitman actuating means; the combination of bearings mounted on the top of the baling chamber, a U-shaped axle having its central portion revolubly held in said bearings, outwardly projecting ends provided with journal portions formed on said axle, tracks mounted beneath said baling chamber, a yoke including a bar having a pair of links connected to the ends thereof, said links having their free ends connected to the outwardly projecting portions of the axle and the bar lying beneath the baling chamber, rollers on said bar arranged to run on said tracks, and means to move said bar longitudinally of the baling chamber to rotate the axle, said means including a sheave carried on said bar, a second sheave adjacent the rear end of the baling chamber, a flexible element having one end connected to the fixed part of the baling chamber, said element being led through the first mentioned sheave and to and through the last mentioned sheave, a hook on said pitman, means on the end of said flexible element to engage said hook, and a guide sheave through which said element passes.

In testimony whereof, I affix my signature, in presence of two witnesses.

HENRY J. BUTT.

Witnesses:
EDNA M. SMITH,
C. W. HAGUE.

---

Copies of this patent may be obtained for five cents each, by addressing the "Commissioner of Patents, Washington, D. C."